US012700881B2

(12) United States Patent
Park et al.

(10) Patent No.: US 12,700,881 B2
(45) Date of Patent: Aug. 4, 2026

(54) DATA TRANSMISSION CIRCUIT, SYSTEM INCLUDING THE SAME, AND DATA TRANSMISSION METHOD

(71) Applicants:SAMSUNG ELECTRONICS CO., LTD., Suwon-si (KR); Uif (University Industry Foundation), Yonsei University, Seoul (KR)

(72) Inventors: Jaekoo Park, Suwon-si (KR); Daewon Rho, Seoul-si (KR); Wooyoung Choi, Seoul-si (KR)

(73) Assignees: SAMSUNG ELECTRONICS CO., LTD., Suwon-si (KR); Uif (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/821,126

(22) Filed: Aug. 30, 2024

(65) Prior Publication Data

US 2025/0080145 A1     Mar. 6, 2025

(30) Foreign Application Priority Data

Sep. 5, 2023    (KR) ........................ 10-2023-0117633
Nov. 9, 2023    (KR) ........................ 10-2023-0154569

(51) Int. Cl.
  *H04B 1/04*        (2006.01)
  *H04L 7/00*        (2006.01)
(52) U.S. Cl.
  CPC ......... *H04B 1/0475* (2013.01); *H04L 7/0091* (2013.01)

(58) Field of Classification Search
  CPC ... H04B 1/0475; H04L 7/0091; H04L 25/493; H04L 25/026
  USPC ................................... 375/295–297
  See application file for complete search history.

(56) References Cited

U.S. PATENT DOCUMENTS

| | | | | |
|---|---|---|---|---|
| 5,396,518 A | * | 3/1995 | How ................... | H04L 27/3427 |
| | | | | 714/790 |
| 6,127,950 A | * | 10/2000 | Yamauchi ............. | H03M 5/145 |
| | | | | 341/51 |
| 6,415,008 B1 | * | 7/2002 | Bechade ........... | H04L 25/03853 |
| | | | | 375/360 |
| 7,205,787 B1 | | 4/2007 | Massoumi et al. | |
| 7,269,212 B1 | * | 9/2007 | Chau ................ | H04L 25/03878 |
| | | | | 375/229 |
| 8,618,833 B1 | | 12/2013 | Bergkvist, Jr. et al. | |
| 8,842,745 B2 | | 9/2014 | Hong et al. | |
| 9,024,665 B2 | | 5/2015 | Conrow et al. | |
| 9,143,171 B1 | | 9/2015 | Chang et al. | |
| 9,819,523 B2 | | 11/2017 | Lee et al. | |
| 9,843,324 B1 | * | 12/2017 | Hafizi ........... | H03K 19/017545 |
| 10,122,553 B2 | | 11/2018 | Jung | |
| 10,263,715 B1 | * | 4/2019 | Kao ....................... | H04B 17/15 |
| 10,560,097 B1 | | 2/2020 | Peng et al. | |
| 10,880,133 B2 | | 12/2020 | Chong | |

(Continued)

*Primary Examiner* — Emmanuel Bayard
(74) *Attorney, Agent, or Firm* — Morgan, Lewis & Bockius LLP

(57)        ABSTRACT

A data transmission circuit including: an encoder configured to output a transition signal that indicates a transition state of an input data signal; a first serializer that receives the transition signal; an auxiliary driver configured to receive an output of the first serializer and drive an output node; a second serializer that receives the input data signal; and a main driver configured to receive an output of the second serializer and drive the output node.

20 Claims, 14 Drawing Sheets

(56)             References Cited

U.S. PATENT DOCUMENTS

| | | | | |
|---|---|---|---|---|
| 10,992,449 | B1 * | 4/2021 | Reiss | G06F 9/30134 |
| 11,031,936 | B1 | 6/2021 | Luo et al. | |
| 12,442,853 | B2 * | 10/2025 | Jeong | H03K 19/20 |
| 2003/0117960 | A1 * | 6/2003 | Quinlan | H04L 1/244 |
| | | | | 375/E7.267 |
| 2005/0088428 | A1 * | 4/2005 | Liu | H04L 25/0272 |
| | | | | 345/204 |
| 2008/0198904 | A1 * | 8/2008 | Chang | H01F 19/08 |
| | | | | 375/E1.002 |
| 2011/0179210 | A1 * | 7/2011 | Matano | G11C 7/1057 |
| | | | | 710/305 |
| 2011/0196997 | A1 * | 8/2011 | Ruberg | G06F 13/4045 |
| | | | | 327/156 |
| 2022/0311646 | A1 * | 9/2022 | Lee | H04L 25/4917 |

* cited by examiner

DATA TRANSMISSION CIRCUIT, SYSTEM INCLUDING THE SAME, AND DATA TRANSMISSION METHOD

CROSS-REFERENCE TO RELATED APPLICATIONS

This application claims priority under 35 U.S.C. § 119 to Korean Patent Application Nos. 10-2023-0117633, filed on Sep. 5, 2023, and 10-2023-0154569, filed on Nov. 9, 2023, in the Korean Intellectual Property Office, the disclosures of which are incorporated by reference herein in their entireties.

TECHNICAL FIELD

The inventive concept relates to a data communication circuit, and more particularly, to a data transmission circuit, a system, and a data transmission method to facilitate seamless communication.

DISCUSSION OF RELATED ART

In light of recent developments in data technology, there is a growing need for communication circuits capable of efficiently handling the transmission and reception of large amounts of data. A transmission device should be able to drive a channel designated for transmission to prevent signal reduction or distortion during a communication process. With the increase in data transmission speeds and data amounts, the size of transmission transistors has increased to ensure high linearity. However, as the size of these transistors increases, there could be an increase in bandwidth demands and power consumption during data transmission.

Therefore, there is a need for a transmission device that provides optimized performance, capable of minimizing bandwidth demands and power consumption while ensuring smooth data transmission and reception.

SUMMARY

The inventive concept provides a data transmission circuit with improved data transmission performance, a system including the same, and a data transmission method.

According to an embodiment of the inventive concept, there is provided a data transmission circuit including: an encoder configured to output a transition signal that indicates a transition state of an input data signal; a first serializer that receives the transition signal; an auxiliary driver configured to receive an output of the first serializer and drive an output node; a second serializer that receives the input data signal; and a main driver configured to receive an output of the second serializer and drive the output node.

According to an embodiment of the inventive concept, there is provided a data transmission method including: encoding an input data signal into a transition signal that indicates a transition state of the input data signal; generating a first serial signal by serializing the transition signal; driving an output node based on the first serial signal; generating a second serial signal by serializing the input data signal; and driving the output node based on the second serial signal, wherein the transition signal includes a rising signal that indicates a rising edge of the first serial signal and a falling signal that indicates a falling edge of the first serial signal.

According to an embodiment of the inventive concept, there is provided a system including a first device and a second device configured to communicate with the first device, wherein the first device includes a data transmission circuit, the data transmission circuit includes: an encoder configured to output a transition signal that indicates a transition state of an input data signal; a first serializer that receives the transition signal; an auxiliary driver that receives an output of the first serializer and is connected to an output node; a second serializer that receives the input data signal; and a main driver that receives an output of the second serializer and is connected to the output node, and the second device includes a data reception circuit configured to receive an output of the first device through the output node.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
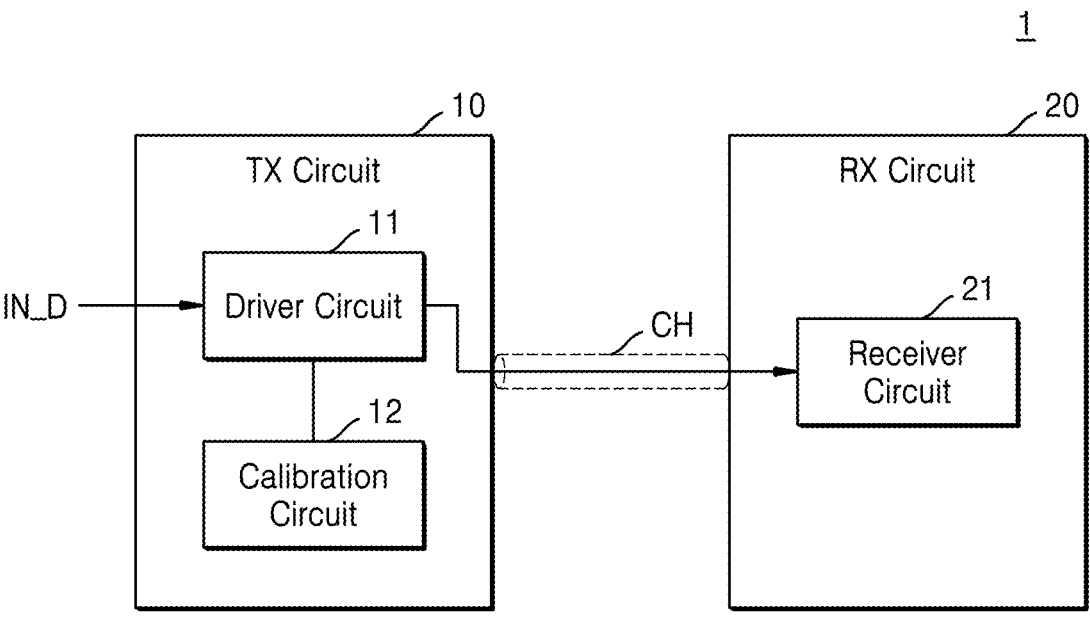
FIG. 1 is a block diagram showing a data communication system according to an embodiment.

FIG. 1 is a block diagram showing a data communication system according to an embodiment.

Referring to FIG. 1, a data communication system 1 may include a data transmission circuit 10, a data reception circuit 20, and a channel CH. The data communication system 1 may transmit data signals between communication devices, for example, first and second devices. According to an embodiment, the data communication system 1 may support communication between a device including the data transmission circuit 10 and a device including the data reception circuit 20.

According to some embodiments, the data transmission circuit 10 may include a driver circuit 11 and a calibration circuit 12. The data transmission circuit 10 may be included in a first device to transmit data and may receive an input data signal IN_D. The driver circuit 11 may receive the input data signal IN_D and transmit the input data signal IN_D to the data reception circuit 20 through the channel CH. The data reception circuit 20 may include a receiver circuit 21. The data reception circuit 20 may be included in a second device for receiving data and may receive an output of the data transmission circuit 10 in the reception circuit 21 through the channel CH. The reception circuit 21 may appropriately process a received signal and provide the processed signal to the second device.

The driver circuit 11 may operate by receiving the input data signal IN_D, driving the channel CH, and performing a driving operation to process the input data signal IN_D. This process prevents signal distortion, including attenuation, during transmission, ensuring that the data reception circuit 20 receives an accurate signal. According to some embodiments, as will be described in detail later, the driver circuit 11 may determine in advance sections where a signal transition occurs through the channel CH by encoding the input data signal IN_D. By driving drivers based on a result of this determination, power consumption associated with the operation of any auxiliary drivers may be reduced. In addition, according to some embodiments, as will be described in detail later, the driver circuit 11 may control sections where drivers are driven, and thus, an edge boosting operation may be flexibly controlled.

The calibration circuit 12 may transmit a calibration signal to the driver circuit 11 to properly drive data intended for transmission. According to some embodiments, the calibration circuit 12 may send distinct calibration signals to two or more drivers included in the driver circuit 11. Each of these drivers, upon receiving their respective calibration signals, may then be driven with individual strengths. For example, the calibration circuit 12 may individually adjust driving strengths by transmitting separate control signals to an auxiliary driver and a main driver within the driver circuit 11.

Figure 2:
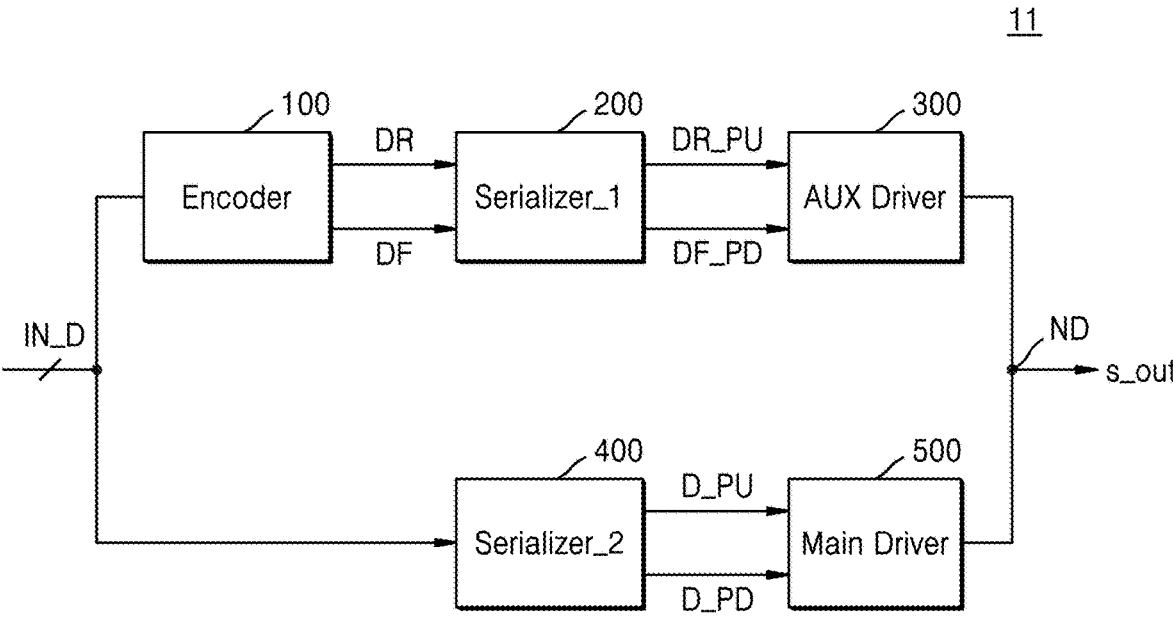
FIG. 2 is a block diagram showing a driver circuit according to an embodiment.

FIG. 2 is a block diagram showing a data driver circuit according to an embodiment.

Referring to FIG. 2, the driver circuit 11 may include an encoder 100, a first serializer 200, an auxiliary driver 300, a second serializer 400, a main driver 500, and an output node ND. The driver circuit 11 may receive the input data signal IN_D to be transmitted.

The encoder 100 may receive the input data signal IN_D and perform an encoding operation. The encoding operation may be an operation to identify the transition state of the input data signal IN_D. For example, the encoding operation may be an operation to identify a section where the input data signal IN_D transitions from a logic low level to a logic high level or may be an operation to identify a section where the input data signal IN_D transitions from a logic high level to a logic low level. According to some embodiments, the encoder 100 may compare data bits included in the input data signal IN_D with each other to identify the transition state of the input data signal IN_D. According to an embodiment, the transition state may be identified by comparing a first bit of the input data signal IN_D with a bit adjacent to the first bit. As a result of the above-stated encoding operation, the encoder 100 may output a transition signal indicating the transition state of the input data signal IN_D. The transition signal may include a data rising signal DR and/or a data falling signal DF. The data rising signal DR may be a signal indicating a section where the input data signal IN_D transitions from a logic low level to a logic high level. The data falling signal DF may be a signal indicating a section where the input data signal IN_D transitions from a logic high level to a logic low level.

The first serializer 200 may receive a transition signal and serialize the transition signal. The input data signal IN_D may be a parallel signal, and the first serializer 200 may serialize the input data signal IN_D for high-speed communication. The first serializer 200 may serialize each of the data rising signal DR and the data falling signal DF. The first serializer 200 may output a data rising pull-up signal DR_PU as a result of serializing the data rising signal DR and output a data falling pull-down signal DF_PD as a result of serializing the data falling signal DF. In other words, the output of the first serializer 200 may be a signal obtained by serializing a transition signal that identifies the transition state of the input data signal IN_D. The first serializer 200 may include at least one multiplexer to perform a serialization operation. According to some embodiments, the data rising pull-up signal DR_PU and/or the data falling pull-down signal DF_PD may be adjusted by including a delay circuit in at least one multiplexer of the first serializer 200. In this case, a pulse width indicated by the data rising pull-up signal DR_PU (e.g., the pulse width that represents a section where the input data signal IN_D transitions to the logic high level) may be adjusted. The data rising pull-up signal DR_PU may drive a pull-up driver of the auxiliary driver 300, and the adjustment of a pulse width due to the delay circuit may control an edge boosting section where the pull-up driver of the auxiliary driver 300 is driven. Likewise, a pulse width indicated by the data falling pull-down signal DF_PD (e.g., the pulse width that represents a section where the input data signal IN_D transitions to the logic low level) may be adjusted. Here, the adjustment of a pulse width due to the delay circuit may control an edge boosting section where the pull-down driver of the auxiliary driver 300 is driven.

The auxiliary driver 300 may be driven by receiving the data rising pull-up signal DR_PU and the data falling pull-down signal DF_PD from the first serializer 200 and may perform an edge boosting operation. The auxiliary driver 300 may be a driver that assists the main driver 500 in driving a data line according to data transition to facilitate driving of the data line. In other words, the auxiliary driver 300 serves as a supplementary component to the main driver 500. The auxiliary driver 300 aids in driving the data line more effectively by responding to data transitions. For example, as described above, the data rising pull-up signal DR_PU may be a signal for controlling the pull-up driver of the auxiliary driver 300, and the auxiliary driver 300 may drive the pull-up driver in response to the data rising pull-up signal DR_PU to correspond to the section where the input data signal IN_D transitions to a logic high level. In addition, the data falling pull-down signal DF_PD may be a signal for controlling the pull-down driver of the auxiliary driver 300, and the auxiliary driver 300 may drive the pull-down driver in response to the data falling pull-down signal DF_PD to correspond to the section where the input data signal IN_D transitions to a logic low level. The auxiliary driver 300 may be connected to the output node ND, and the auxiliary driver 300 may drive the output node ND.

The second serializer 400 may receive the input data signal IN_D and perform a serialization operation. The second serializer 400 may output a data pull-up signal D_PU and a data pull-down signal D_PD for driving the main driver 500 by serializing the input data signal IN_D.

The main driver 500 may be driven by receiving the data pull-up signal D_PU and the data pull-down signal D_PD from the second serializer 400. The data pull-up signal D_PU may be a signal for controlling the pull-up driver of the main driver 500, and the main driver 500 may drive its pull-up driver to correspond to the input data signal IN_D in response to the data pull-up signal D_PU. In addition, the data pull-down signal D_PD may be a signal for controlling the pull-down driver of the main driver 500, and the main driver 500 may drive its pull-down driver to correspond to the input data signal IN_D in response to the data pull-down signal D_PD. The main driver 500 may be connected to the output node ND, and the main driver 500 may drive the output node ND. In other words, the output of the auxiliary driver 300 and the output of the main driver 500 may be combined at the output node ND and transmitted to another device as an output signal s_out.

In other words, the data transmission circuit 10 according to an embodiment may obtain information regarding the transition state of a signal before serializing the signal, and thus, the operation speed for identifying the transition may be increased. For example, rather than obtaining transition information in a high-speed band where serialization has already been performed, the data transmission circuit 10 may obtain transition information by encoding in a low-speed band before serialization, thereby increasing operation speed and facilitating time synchronization between the auxiliary driver 300 and the main driver 500.

The data transmission circuit 10 according to an embodiment may extract the transition state of the input data signal IN_D in advance and control the auxiliary driver 300 to be driven only in a section corresponding to the extracted transition state, thereby reducing power consumption. In addition, since an AC operation (e.g., transition) section and a DC operation (e.g., stable) section of the input data signal IN_D may be separated, it is possible to remove the passive resistance in a transmission circuit with a source series termination (SST) driver structure, and thus, the overall circuit size may be reduced.

Furthermore, both the main driver 500 and the auxiliary driver 300 may employ the same structure for data paths (e.g., circuit structure), thereby facilitating optimization of a circuit (e.g., the data paths may be optimized).

Figure 3:
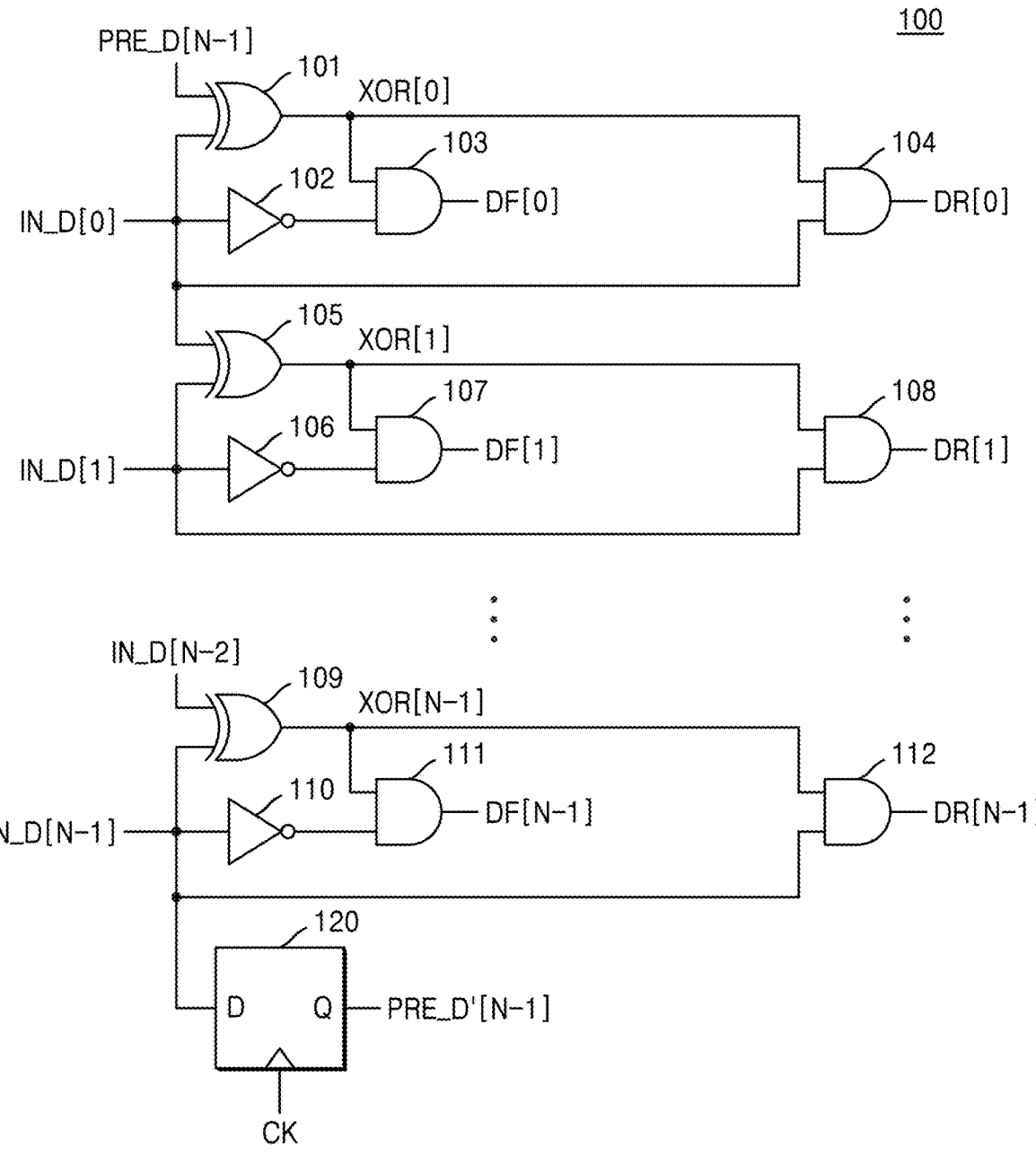
FIG. 3 is a circuit diagram showing an encoder according to an embodiment in detail.

FIG. 3 is a circuit diagram showing an encoder according to an embodiment in detail.

Referring to FIG. 3, the encoder 100 may include a plurality of logic gates 101, 102, 103, 104, 105, 106, 107, 108, 109, 110, 111 and 112. The encoder 100 may receive the input data signal IN_D output a data rising signal DR and/or a data falling signal DF indicating the transition state of an output of the first serializer (200 of FIG. 2) by using the plurality of logic gates 101 to 112.

For example, the input data signal IN_D received by the encoder 100 may include N bits of data (N is a natural number equal to or greater than 1), and respective bits of the input data signal IN_D may be referred to as first to N-th bits. Respective bits of the data rising signal DR may be referred to as a first rising bit DR[0] to N-th rising bits DR[N−1], and respective bits of the data falling signal DF may be referred to as a first falling bit DF [0] to N-th falling bit DF[N−1].

According to some embodiments, the encoder 100 may generate the first rising bit DR[0] indicating a rising transition state by comparing the least significant bit (LSB) PRE_D[N−1] of a previous input data signal with the first bit IN_D[0] by using an XOR gate 101 and an AND gate 104. For example, when the LSB PRE_D[N−1] of the previous input data signal is at a logic low level and the first bit IN_D[0] is at a logic high level, the XOR gate 101 may receive the LSB PRE_D[N−1] of the previous input signal and the first bit IN_D[0] and output a first XOR signal XOR[0] at a logic high level, and the AND gate 104 may receive the first bit IN_D[0] and the first XOR signal XOR[0] and output the first rising bit DR[0]. At this time, the first rising bit DR[0] may be output at a logic high level, which indicates that the input data signal IN_D has made a rising transition at the first bit IN_D[0]. In addition, the encoder 100 may generate the first falling bit DF [0] indicating a falling transition state by comparing the LSB PRE_D[N−1] of the previous input data signal with the first bit IN_D[0] by using the XOR gate 101, an inverter 102, and the AND gate 103. In the same regard, the encoder 100 may compare the first bit IN_D[0] with a second bit IN_D[1] by using an XOR gate 105, an inverter 106, and AND gates 107 and 108 and output a second rising bit DR[1] and a second falling bit DF [1]. By comparing bits of the input data signal IN_D with one another, all bits DR[0] to DR[N−1] of the data rising signal DR and all bits DF [0] to DF [N−1] of the data falling signal DF may be output.

According to some embodiments, the encoder 100 may include a flip-flop 120 to latch an (N−1)-th bit IN_D[N−1]. In other words, the encoder 100 may compare the N-th bit IN_D[N−1] of the input data signal (IN_D) with the most significant bit (MSB) of a subsequent input data signal. For example, the encoder 100 may latch the N-th bit IN_D[N−1] by using the flip-flop 120. A latched N-th bit PRE_D' [N−1] may be provided as an input to the XOR gate 101 and may be compared with a subsequent input data signal.

In the same regard, the encoder 100 may identify the transition state of a signal output through an output node by comparing bits of the input data signal IN_D with one another. However, the encoding method shown in FIG. 3 is merely an example, and various encoder structures may be implemented to identify the transition state of a signal output through an output node.

Figure 4:
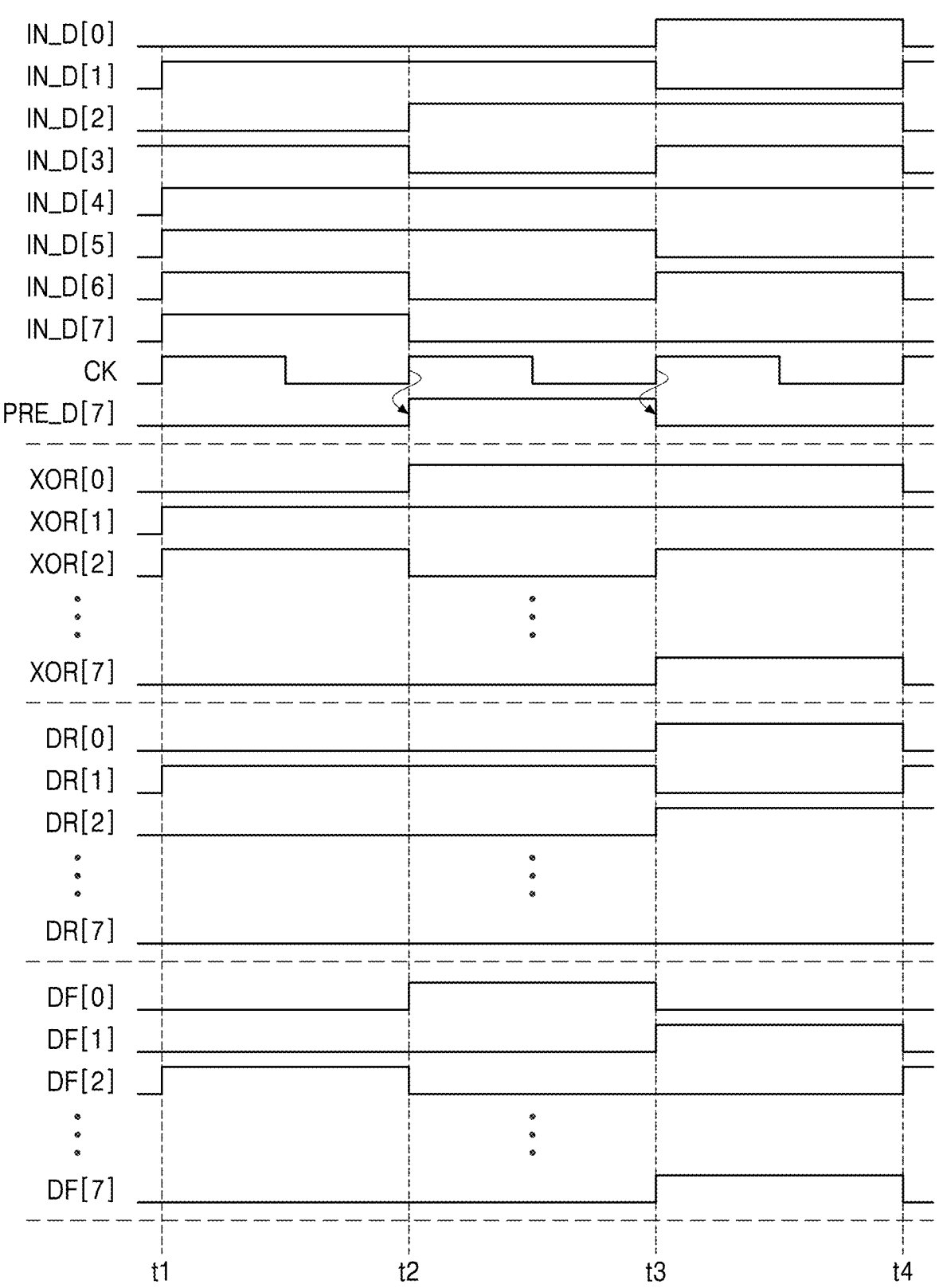
FIG. 4 is a timing diagram showing an example of an encoding process according to an embodiment.

FIG. 4 is a timing diagram showing an example of an encoding process according to an embodiment. In FIG. 4, first to seventh bits IN_D[0] to IN_D[7], a clock signal CK, first to seventh rising bits DR[0] to DR[7], first to seventh falling bits DR[0] to DR[7], a seventh previous input data signal PRE_D[7] and first to seventh XOR signals XOR[0] to XOR[7] are shown.

Referring to FIGS. 3 and 4, the encoder 100 may generate the data rising signal DR and the data falling signal DF through encoding based on bits of the input data signal IN_D.

For example, the encoder 100 may generate the second rising bit DR[1] through an encoding operation based on the first bit IN_D[0] and the second bit IN_D[1]. As shown in FIG. 4, the first bit IN_D[0] may be at a logic low level at a time point t1, and the second bit IN_D[1] may be at a logic high level at the time point t1. As a result of performing the encoding operation described above with reference to FIG. 3, the encoder 100 may output the second rising bit DR[1]. In other words, since the second bit IN_D[1] of the input data signal IN_D makes a rising transition to the logic high level at the time point t1, the second rising bit DR[1], which is the output of the encoder 100, makes the rise transition at the time point t1, thereby indicating the transition state of the input data signal IN_D. Subsequently, the first bit IN_D[0] may be at a logic low level at a time point t2, and the second bit IN_D[1] may be at a logic high level at the time point t2. In other words, since the second bit IN_D[1] of the input data signal IN_D makes a rising transition to the logic high level at the time point t2, the second rising bit DR[1], which is the output of the encoder 100, may be maintained at the logic high level at the time point t2, thereby indicating the transition state of the input data signal IN_D.

In addition, the first bit IN_D[0] may be at a logic high level at a time point t3, and the second bit IN_D[1] may be at a logic low level at the time point t3. In other words, since the second bit IN_D[1] of the input data signal IN_D did not make the rising transition to the logic high level at the time point t3, the second rising bit DR[1] may transition to a logic low level at the time point t3, thereby indicating the transition state of the input data signal IN_D. In addition, since the second bit IN_D[1] of the input data signal IN_D has transitioned to a logic low level at the time point t3, the second falling bit DF [1] may transition to a logic high level, thereby indicating the transition state of the input data signal IN_D. As described above, the encoder 100 may generate the data rising signal DR and the data falling signal DF indicating transition states between bits of the input data signal IN_D.

Figure 5A:
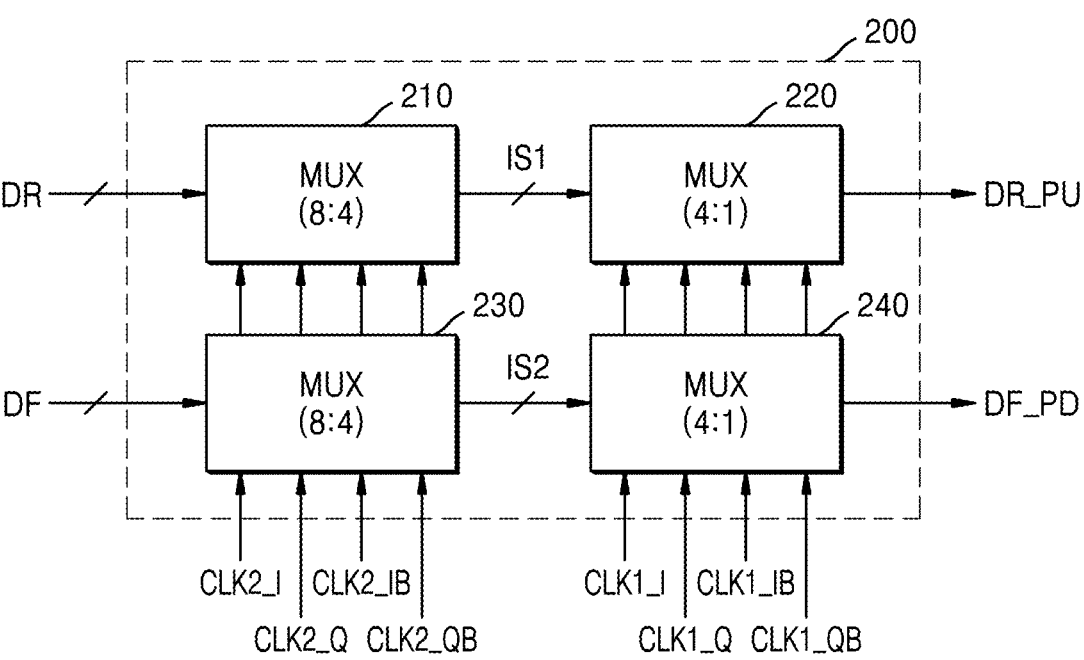
FIGS. 5A and 5B are block diagrams showing a serializer according to an embodiment.
Figure 5B:
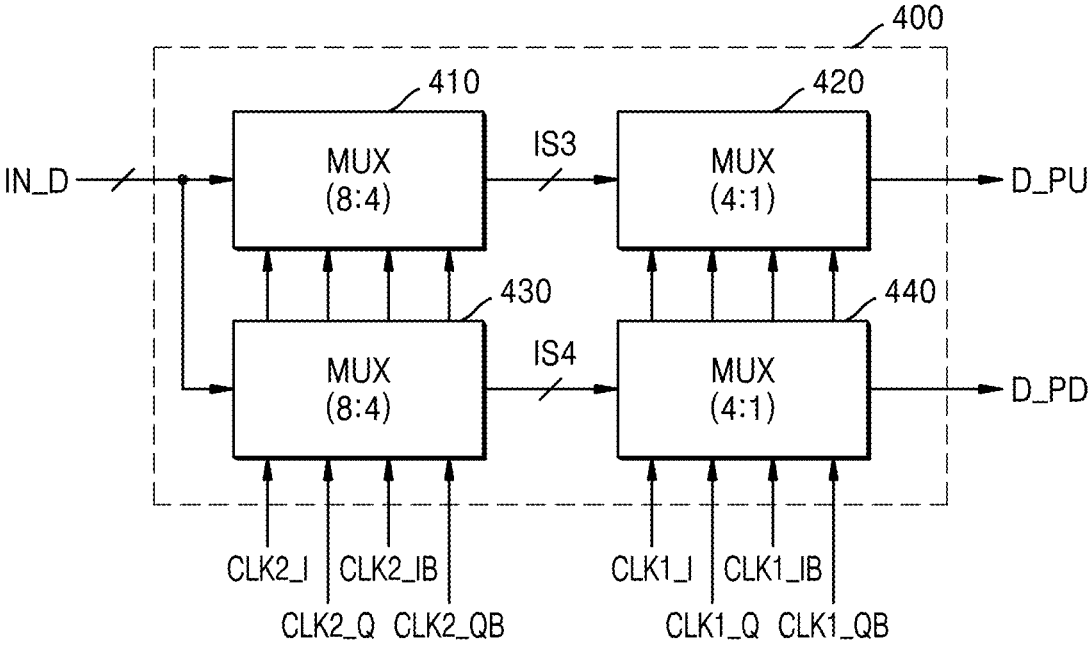

FIGS. 5A and 5B are block diagrams showing a serializer according to an embodiment.

Referring to FIG. 5A, the first serializer 200 may include a plurality of multiplexers, for example, first, second, third and fourth multiplexers 210, 220, 230 and 240, for serializing a transition signal. Hereinafter, for convenience of explanation, it is assumed that the input data signal IN_D is 8-bit data.

The first serializer 200 may receive the data rising signal DR and the data falling signal DF and perform a serialization operation on each of them. According to some embodiments, the first serializer 200 may include a first multiplexer 210 and a second multiplexer 220 that serialize the data rising signal DR. The first multiplexer 210 may serialize the data rising signal DR, which is 8-bit data, into 4-bit data and output it as a first internal signal IS1. The second multiplexer 220 may serialize the first internal signal IS1, which is 4-bit data, into 1-bit data and output is as the data rising pull-up signal DR_PU. The first serializer 200 may include a third multiplexer 230 and a fourth multiplexer 240 that serialize the data falling signal DF. Here, the third multiplexer 230 may serialize the data falling signal DF, which is 8-bit data, into a second internal signal IS2, which is 4-bit data, and the fourth multiplexer 240 may serialize the second internal signal IS2, which is 4-bit data, into 1-bit data and output it as the data falling pull-down signal DF_PD.

To synchronize operations of serializing the data rising signal DR and the data falling signal DF, the same clock signals CLK2_I, CLK2_Q, CLK2_IB, and CLK2_QB for serialization may be applied to each of the first multiplexer 210 and the third multiplexer 230. In addition, to synchronize the operations of serializing the first internal signal IS1 and the second internal signal IS2, the same clock signals CLK1_I, CLK1_Q, CLK1_IB, and CLK1_QB may be applied to each of the second multiplexer 220 and the fourth multiplexer 240. According to some embodiments, by arranging delay circuits in the second multiplexer 220 and the fourth multiplexer 240, the time for the data rising pull-up signal DR_PU and the data falling pull-down signal DF_PD to drive an auxiliary driver may be controlled.

Referring to FIG. 5B, the second serializer 400 may include a fifth multiplexer 410 and a seventh multiplexer 430 that receive the input data signal IN_D and serialize it into a third internal signal IS3 and a fourth internal signal IS4, respectively, and a sixth multiplexer 420 and an eighth multiplexer 440 that receive the third internal signal IS3 and the fourth internal signal IS4 and output the data pull-up signal D_PU and the data pull-down signal D_PD, respectively. For synchronization, the same clock signals CLK2_I, CLK2_Q, CLK2_IB, CLK2_QB may be applied to each of the fifth multiplexer 410 and the seventh multiplexer 430, and, similarly, the same clock signals CLK1_I, CLK1_Q, CLK1_IB, and CLK1_QB may be applied to each of the sixth multiplexer 420 and the eighth multiplexer 440. A main driver may be driven in response to the data pull-up signal D_PU and the data pull-down signal D_PD.

Figure 6A:
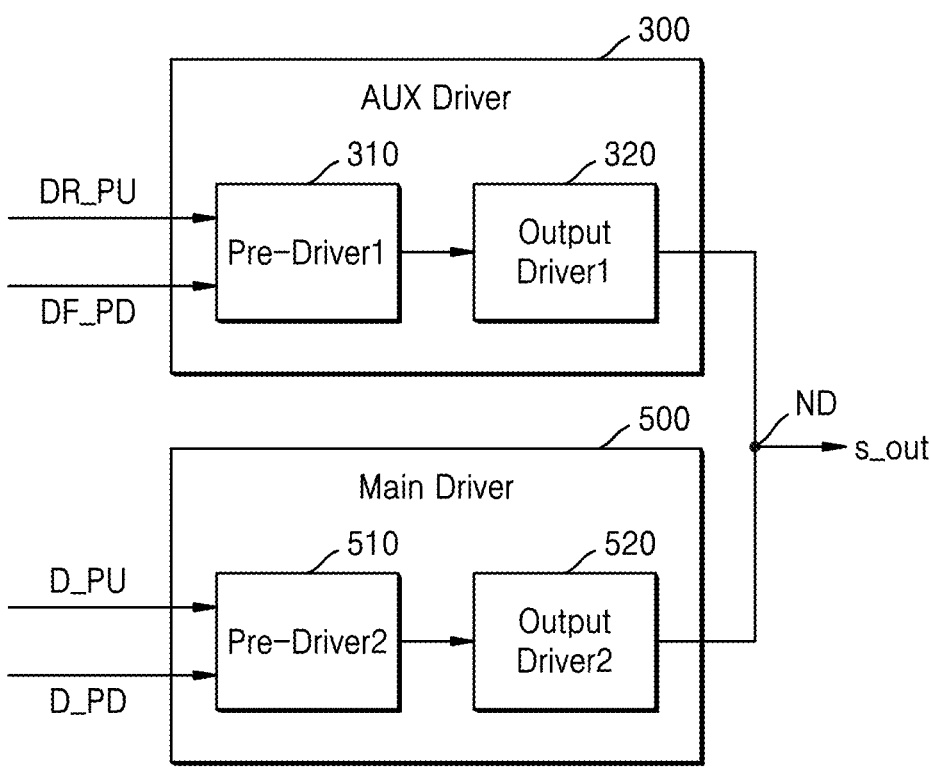
FIG. 6A is a block diagram showing the structure of a driver according to an embodiment.

FIG. 6A is a block diagram showing the structure of a driver according to an embodiment.

Referring to FIG. 6A, the auxiliary driver 300 may include a first pre-driver 310 and a first output driver 320, and the main driver 500 may include a second pre-driver 510 and a second output driver 520. The first pre-driver 310 may receive the data rising pull-up signal DR_PU and the data falling pull-down signal DF_PD, perform a pre-driving operation, and then, provide signals to the first output driver 320. The first output driver 320 may perform a driving operation in response to the signals received from the first pre-driver 310. The second pre-driver 510 may receive the data pull-up signal D_PU and the data pull-down signal D_PD, perform a pre-driving operation, and then, provide signals to the second output driver 520. The second output driver 520 may perform a driving operation in response to the signals received from the second pre-driver 510. In other words, the output of the auxiliary driver 300 and the output of the main driver 500 may be combined at the output node ND and then output as the output signal s_out. As described above, since the auxiliary driver 300 operates according to the transition state of an input data signal, the auxiliary driver 300 may operate simultaneously with the main driver 500 to perform boosting in a section where data transitions. In addition, in sections where data does not transition, the auxiliary driver 300 may enter a high impedance state and not operate, and thus, the size of the output signal s_out may not be changed.

Figure 6B:
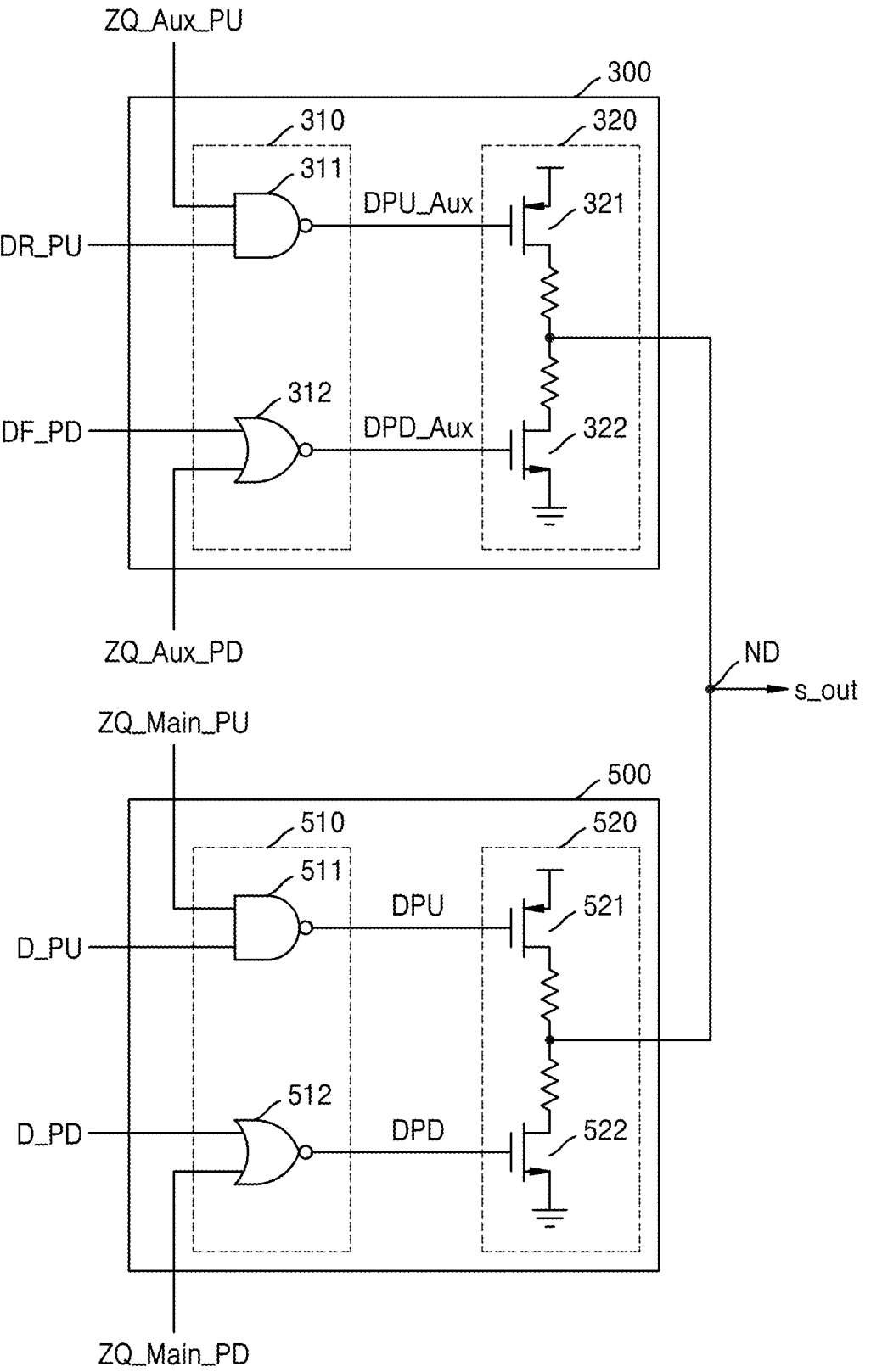
FIG. 6B is a circuit diagram showing a driver according to an embodiment in detail.
Figure 7:
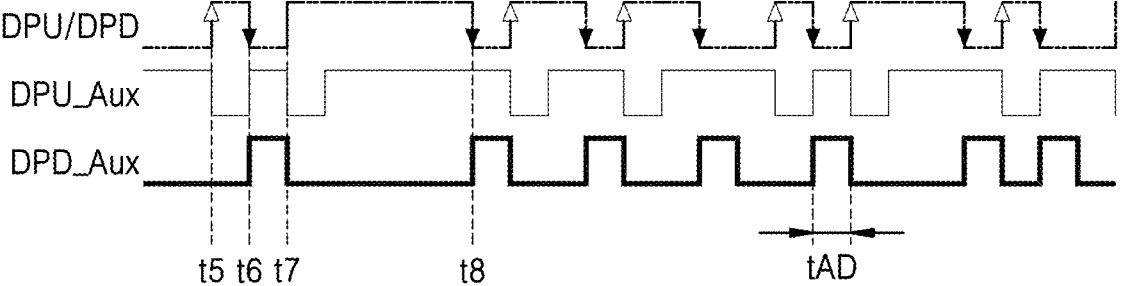
FIG. 7 is a timing diagram showing a process of driving a driver, according to an embodiment.

FIG. 6B is a circuit diagram showing a driver according to an embodiment in detail. FIG. 7 is a timing diagram showing a process of driving a driver, according to an embodiment.

Referring to FIGS. 6A, 6B, and 7, the auxiliary driver 300 and the main driver 500 may drive the output node ND by receiving a driving signal from a serializer.

The auxiliary driver 300 may include the first pre-driver 310 and the first output driver 320, and the first pre-driver 310 may receive the data rising pull-up signal DR_PU and the data falling pull-down signal DF_PD, as described above. The first pre-driver 310 may receive ZQ calibration signals ZQ_AUX_PU and ZQ_AUX_PD for pre-driving from the calibration circuit 12 described above with reference to FIG. 1. According to some embodiments, the auxiliary driver 300 and main driver 500 may be controlled separately by receiving ZQ calibration signals from the calibration circuit 12, respectively.

A first gate 311 of the first pre-driver 310 may receive the data rising pull-up signal DR_PU and a ZQ pull-up signal ZQ_AUX_PU and output an auxiliary driver pull-up signal (hereinafter referred to as a first pull-up signal) DPU_Aux. According to an embodiment, a first pull-up transistor 321 may be a P-type transistor. For example, when an input data signal has a rising transition at a time point t5, based on an encoding operation as described above with reference to FIG. 4, the data rising pull-up signal DR_PU may transition to a logic high level. When the first gate 311 receives the data rising pull-up signal DR_PU of a logic high level, the first gate 311 may output the first pull-up signal DPU_Aux that transitions to a logic low level at the time point t5 through a gating operation. In the same regard, when an input data signal has a rising transition at a time point t7, the first gate 311 may receive the data rising pull-up signal DR_PU of a logic high level and may output the first pull-up signal DPU_Aux that transitions to a logic low level at the time point t7. The first pull-up transistor 321 of the first output driver 320 is enabled by receiving the first pull-up signal DPU_Aux of a logic low level at time points t5 and t7 and may perform a driving operation.

A second gate 312 of the first pre-driver 310 may receive the data falling pull-down signal DF_PD and a ZQ pull-down signal ZQ_AUX_PD and output an auxiliary driver pull-down signal (hereinafter referred to as a first pull-down signal) DPD_Aux. According to an embodiment, a first pull-down transistor 322 may be an N-type transistor. For example, when an input data signal has a falling transition at a time point t6, the second gate 312 may receive the data falling pull-down signal DF_PD and output the first pull-down signal DPD_Aux that transitions to a logic high level at the time point t6 through a gating operation. In the same regard, when an input data signal has a falling transition at a time point t8, the first gate 311 may receive the data falling pull-down signal DF_PD of a logic high level and may perform a gating operation, thereby outputting the first pull-down signal DPD_Aux that transitions to a logic high level at the time point t8. The first pull-down transistor 322 of the first output driver 320 is enabled by receiving the first pull-down signal DPD_Aux of a logic high level and may perform a driving operation. Therefore, the auxiliary driver 300 may drive the output node ND.

According to some embodiments, a pulse width tAD indicating the length of a section where the first pull-up signal DPU_Aux transitions to the logic low level and the length of a section where the first pull-down signal DPD_Aux transitions to the logic high level may be 1 unit interval (UI).

The main driver 500 may include the second pre-driver 510 and the second output driver 520, and a third gate 511 and a fourth gate 512 of the second pre-driver 510 may receive the data pull-up signal D_PU and the data pull-down signal D_PD, respectively, and output a second pull-up signal DPU and a second pull-down signal DPD for operating a second pull-up transistor 521 and a second pull-down transistor 522 of the second output driver 520, respectively. The main driver 500 may perform a driving operation in response to the second pull-up signal DPU and the second pull-down signal DPD, thereby driving the output node ND. In other words, the output of the auxiliary driver 300 and the output of the main driver 500 may be combined at the output node ND and transmitted to another device as the output signal s_out.

As a result, through the operation of driving the first pre-driver 310 and the first output driver 320 of the auxiliary driver 300 based on encoding as described above, the auxiliary driver 300 may operate only when a transition occurs in an input data signal. In other words, in a stable section where there is no data transition, a driver may maintain a high impedance state and may not be driven, and thus, power consumption for driving the driver may be reduced.

Figure 8:
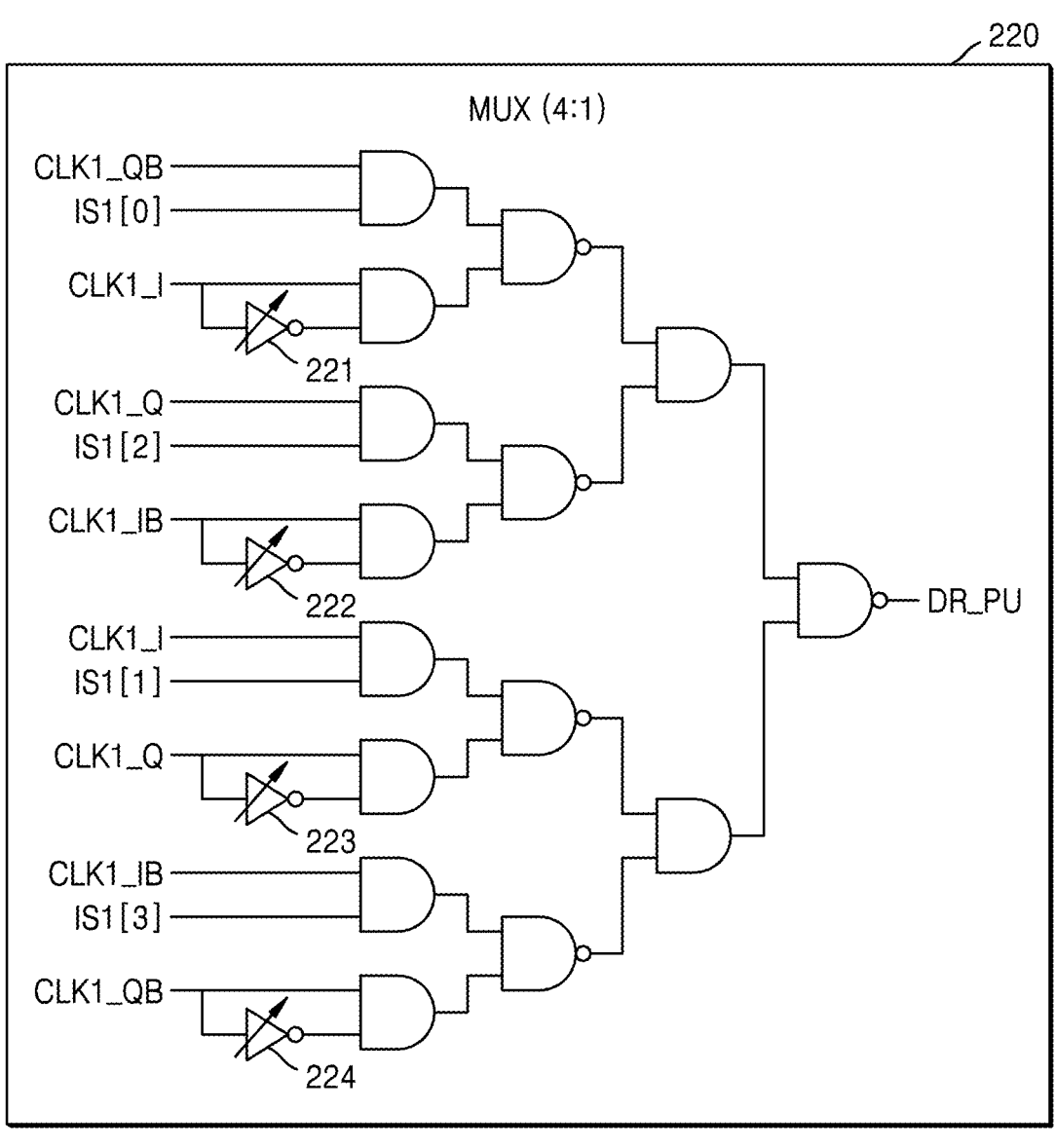
FIG. 8 is a circuit diagram showing a serializer according to an embodiment in detail.

FIG. 8 is a circuit diagram showing a serializer according to an embodiment in detail.

Referring to FIGS. 5A to 8, the second multiplexer 220 and the fourth multiplexer 240 of the first serializer 200 may include a plurality of delay circuits, in other words, first, second, third and fourth delay circuits 221, 222, 223 and 224. A data transmission circuit according to an embodiment may control the time in which the auxiliary driver 300 is driven by controlling the first to fourth delay circuits 221 to 224. Hereinafter, for convenience of explanation, the description will be given based on the second multiplexer 220.

As described above, the second multiplexer 220 may serialize the first internal signal IS1 and output the data rising pull-up signal DR_PU. The second multiplexer 220 may receive the clock signals CLK1_I, CLK1_Q, CLK1_IB, and CLK1_QB for performing a multiplexing operation. A first clock signal CLK1_I may be a signal having a phase difference of 90 degrees from a second clock signal CLK1_Q, and may be an inverted signal of a third clock signal CLK1_IB. A fourth clock signal CLK1_QB may be an inverted signal of the third clock signal CLK1_IB. As shown in the drawings, the second multiplexer 220 may perform multiplexing through logic gates, and bits IS[0], IS[1], IS[2], and IS[3] of the first internal signal IS1 may be serialized based on the clock signals CLK1_I, CLK1_Q, CLK1_IB, and CLK1_QB. According to some embodiments, the second multiplexer 220 may further include the first to fourth delay circuits 221 to 224. The first to fourth delay circuits 221 to 224 may receive the first clock signal CLK1_I, a second clock signal CLK1_IB, a third clock signal CLK1_Q, and a fourth clock signal CKI_QB, respectively, and output delayed signals. Based on the operations of the first to fourth delay circuits 221 to 224, the period for driving the auxiliary driver 300 may be controlled. In other words, the pulse width tAD of a first pull-up signal DPU_Aux output by the first pre-driver 310 may be adjusted based on a delayed data rising pull-up signal DR_PU. In the same regard, the fourth multiplexer 240 also includes four delay circuits, and thus, the pulse width tAD of a first pull-down signal DPD_Aux output by the first pre-driver 310 based on a delayed data falling pull-down signal DF_PD may be adjusted.

In other words, the pulse width tAD shown in FIG. 7 may be adjusted. More specifically, the rising transition time of a data pull-up signal (DPU) and the corresponding falling transition time of the first pull-up signal (DPU_Aux) may be the same at the time point t5. However, when a delay operation is performed based on the first to fourth delay circuits 221 to 224, the time for the first pull-up signal DPU_Aux to transition to a logic high level again may be reduced. For example, when a delay operation is not performed, the first pull-up signal DPU_Aux may transition to a logic low level in correspondence with the rising transition of an input data signal at the time point t5 and may transition to a logic high level at the time point t6. However, when a delay operation is performed by the first to fourth delay circuits 221 to 224, the first pull-up signal DPU_Aux transitions to a logic low level from time point t5, but the first pull-up signal DPU_Aux may transition to a logic high level at a time point earlier than the time point t6. In other words, a section where the first pull-up signal DPU_Aux has a logic low level value in correspondence with one rising transition of an input data signal may become shorter than 1 UI. Therefore, a period during which the first pre-driver 310 and the first output driver 320 of the auxiliary driver 300 are driven by the first pull-up signal DPU_Aux may be shortened. In the same regard, due to the first to fourth delay circuits 221 to 224, a section where the first pull-down signal DPD_Aux has a logic high level value in correspondence with one falling transition of the input data signal may become shorter than 1 UI, and thus, a period during which the first pre-driver 310 and the first output driver 320 perform edge boosting may be shortened.

Therefore, a data transmission circuit according to an embodiment may drive an auxiliary driver in correspondence with transition of a data signal, thereby not only reducing power consumption and optimizing a circuit, but also adjusting a period during which the auxiliary driver is driven through a delay circuit. Therefore, edge boosting may be performed more flexibly.

Figure 9:
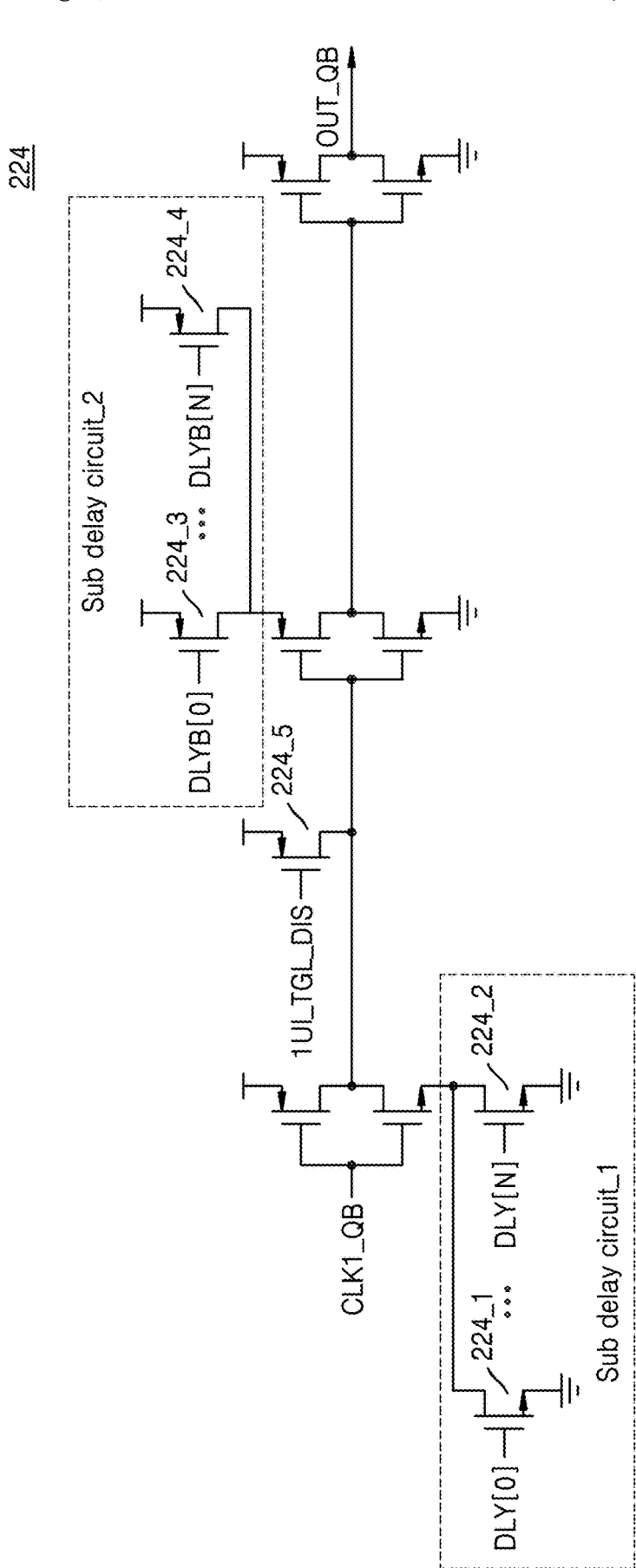
FIG. 9 is a circuit diagram showing a delay circuit according to an embodiment in detail.

FIG. 9 is a circuit diagram showing a delay circuit according to an embodiment in detail. For convenience of explanation, an embodiment of the fourth delay circuit 224 of FIG. 8 will be described in this drawing.

Referring to FIGS. 7 to 9, the fourth delay circuit 224 may include transistors 224_1 to 224_4 for a delay operation. The fourth delay circuit 224 may receive a fourth clock signal CLK1_QB and output a delayed clock signal OUT_QB through a plurality of inverting operations. According to an embodiment, the fourth delay circuit 224 may include a three-stage inverter structure.

According to some embodiments, the fourth delay circuit 224 may include a first sub-delay circuit and a second sub-delay circuit for adjusting the amount by which the fourth clock signal CLK1_QB is delayed. The first sub-delay circuit may include one or more N-type transistors 224_1 to 224_2, and the second sub-delay circuit may include one or more P-type transistors 224_3 to 224_4. For example, the fourth delay circuit 224 may receive a toggle disable signal 1UI_TGL_DIS. When the toggle disable signal 1UI_TGL_DIS is at a logic low level, a transistor 224_5 may be turned on, and the pulse width tAD of the first pull-up signal DPU_Aux and the first pull-down signal DPD_Aux may be set to 1 UI without performing a separate delay operation.

On the other hand, when the toggle disable signal 1UI_TGL_DIS is at a logic high level, the transistor 224_5 may be turned off, and the first sub-delay circuit and the second sub-delay circuit may control at least one of the transistors 224_1 to 224_4 to be turned on to perform a delay operation. In other words, the fourth clock signal CLK1_QB may be delayed through a plurality of inverting operations. The first sub-delay circuit may receive delay signals DLY[0] to DLY[N] and control the transistors 224_1 to 224_2. According to an embodiment, the transistors 224_1 and 224_2 of the first sub-delay circuit may be N-type transistors, and the amount of delay may be adjusted by adjusting the number of transistors to be turned on by the delay signals DLY[0] to DLY[N]. In addition, the transistors 224_3 and 224_4 of the first sub-delay circuit may be P-type transistors, and the amount of delay may be adjusted by adjusting the number of transistors to be turned on by delay signals DLYB[0] to DLYB[N]. The delay signals DLY[0] to DLY[N] received by the first sub-delay circuit and the delay signals DLYB[0] to DLYB[N] received by the second sub-delay circuit may be complementary to each other. However, FIG. 9 merely an example, and the inventive concept is not limited thereto. For example, circuits with various structures for delaying the fourth clock signal CLK1_QB may be implemented, and transistors included in the circuits may also be implemented in various types and structures.

As a result, a data transmission circuit according to an embodiment may control the pulse width tAD of the first pull-up signal DPU_Aux and the first pull-down signal DPD_Aux for driving the auxiliary driver 300 by controlling a delay circuit. Therefore, the data transmission circuit may adjust the period for driving an auxiliary driver and perform an edge boosting operation more flexibly.

Figure 10:
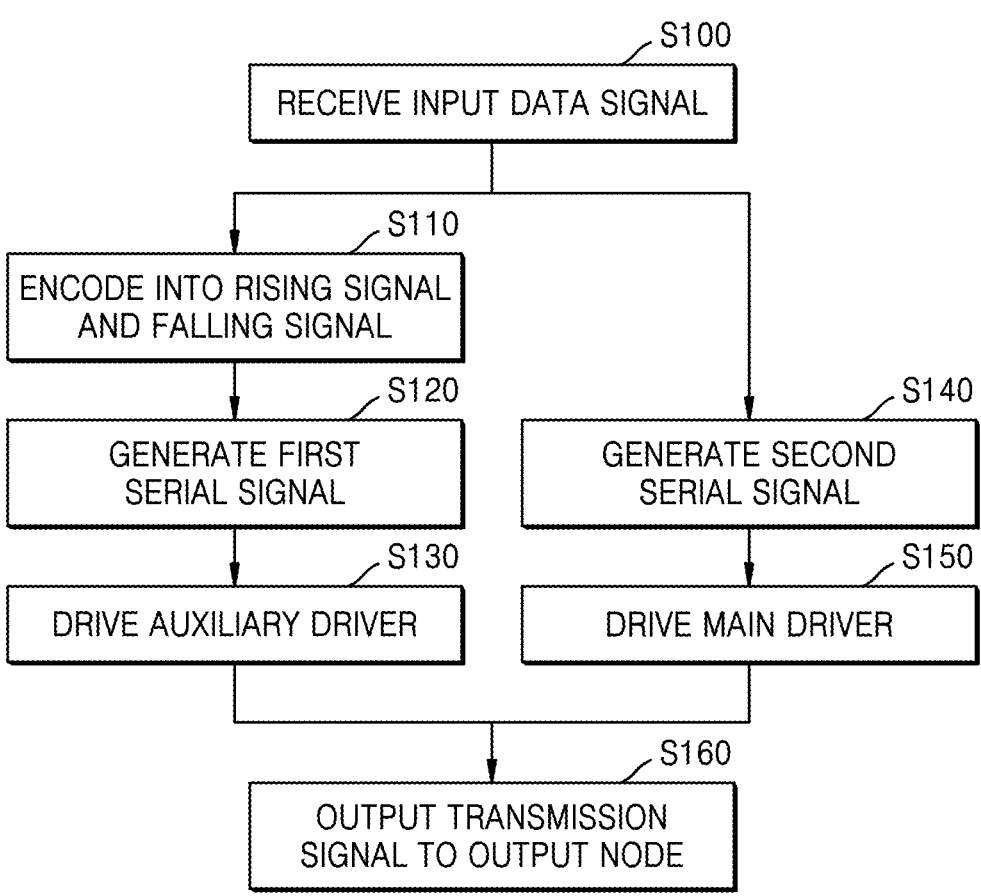
FIG. 10 is a flowchart of a data transmission method according to an embodiment.

FIG. 10 is a flowchart of a data transmission method according to an embodiment.

Referring to FIG. 10, the data transmission method according to an embodiment may include a plurality of operations S100 to S160. Hereinafter, FIG. 10 will be described with reference to the previous drawings, and descriptions identical to those given above with reference to the previous drawings will be omitted.

In operation S100, the data transmission circuit 10 may receive the input data signal IN_D to be transmitted. The input data signal IN_D may be a parallelization signal and may be driven by the driver circuit 11 for accurate data transmission.

In operation S110, the encoder 100 may generate a transition signal by performing an encoding operation to identify the transition state of the input data signal IN_D. The transition signal may be a data rising signal DR indicating a section where the input data signal IN_D transitions from a logic low level to a logic high level or may be a data falling signal DF indicating a section where the input data signal IN_D transitions from a logic high level to a logic low level. According to some embodiments, the encoder 100 may generate a transition signal by comparing any one bit of the input data signal IN_D with a bit adjacent to the any one bit.

In operation S120, the first serializer 200 may output first serial signals (e.g., the data rising pull-up signal DR_PU and the data falling pull-down signal DF_PD) by receiving and serializing the transition signals (the data rising signal DR and the data falling signal DF).

In operation S130, the auxiliary driver 300 may be driven by receiving the data rising pull-up signal DR_PU and the data falling pull-down signal DF_PD, which are outputs from the first serializer 200, and may perform an edge boosting operation. In other words, the auxiliary driver 300 may drive the first pre-driver 310 and the first output driver 320 to correspond with a section where the input data signal IN_D transitions to a logic high level, based on the data rising pull-up signal DR_PU. In addition, the auxiliary driver 300 may drive the first pre-driver 310 and the first output driver 320 to correspond with a section where the input data signal IN_D transitions to a logic low level, based on the data falling pull-down signal DF_PD.

In operation S140, the second serializer 400 may output a data pull-up signal D_PU and a data pull-down signal D_PD for driving the main driver 500 by serializing the input data signal IN_D.

In operation S150, the main driver 500 may drive the second pre-driver 510 and the second output driver 520 to correspond with the input data signal IN_D, based on the data pull-up signal D_PU and the data pull-down signal D_PD, which are outputs of the second serializer 400.

Figure 11:
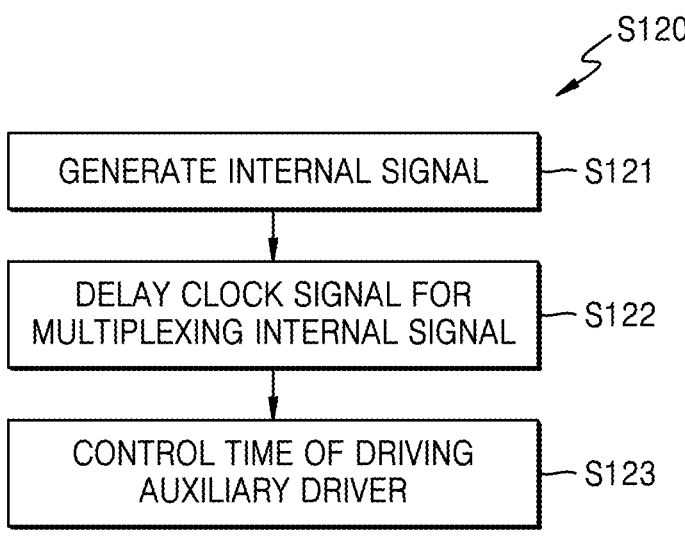
FIG. 11 is a flowchart showing a serialization process according to an embodiment.

The auxiliary driver 300 and the main driver 500 may be commonly connected to the output node ND. In operation S160, the output of the auxiliary driver 300 and the output of the main driver 500 may be combined at the output node ND and output as a signal to be transmitted. FIG. 11 is a flowchart showing a serialization process according to an embodiment.

Referring to FIG. 11, operation S120 of outputting the first serial signals (e.g., the data rising signal DR and the data falling signal DF) may include a plurality of operations S121, S122, and S123.

In operation S121, the first serializer 200 may include a plurality of multiplexers, e.g., the first to fourth multiplexers 210 to 240, for generating internal signals. For example, the first serializer 200 may include the first multiplexer 210 that multiplexes the data rising signal DR, and the first multiplexer 210 may receive the data rising signal DR and output the data rising signal DR as the first internal signal IS1. In addition, the first serializer 200 may include the third multiplexer 230 for multiplexing the data falling signal DF, and the third multiplexer 230 may receive the data falling signal DF and output the data falling signal DF as the second internal signal IS2.

In operation S122, the second multiplexer 220 and the fourth multiplexer 240 may output first serial signals, which are outputs of the first serializer 200. In detail, the second multiplexer 220 may serialize the first internal signal IS1 and output a serialized signal as the data rising pull-up signal DR_PU (e.g., a first serial signal). In addition, the second multiplexer 220 may further include the delay circuits, e.g., the first to fourth delay circuits 221 to 224, and the first to fourth delay circuits 221 to 224 may delay clock signals for multiplexing. The fourth multiplexer 240 may also output the data falling pull-down signal DF_PD (e.g., the first serial signal) in the same manner and delay clock signals by using delay circuits.

In operation S123, the data rising pull-up signal DR_PU and the data falling pull-down signal DF_PD output by the first serializer 200 may be controlled according to a delayed clock signal. The pulse width tAD of the first pull-up signal DPU_Aux and the first pull-down signal DPD_Aux may be adjusted based on a delayed data rising pull-up signal DR_PU and a delayed data falling pull-down signal DF_PD. Therefore, the data transmission circuit 10 may adjust a period during which the first pre-driver 310 and the first output driver 320 of the auxiliary driver 300 perform edge boosting. For example, the data transmission circuit 10 may control the first pre-driver 310 and the first output driver 320 of the auxiliary driver 300 to perform edge boosting for a period shorter than 1 UI.

Figure 12:
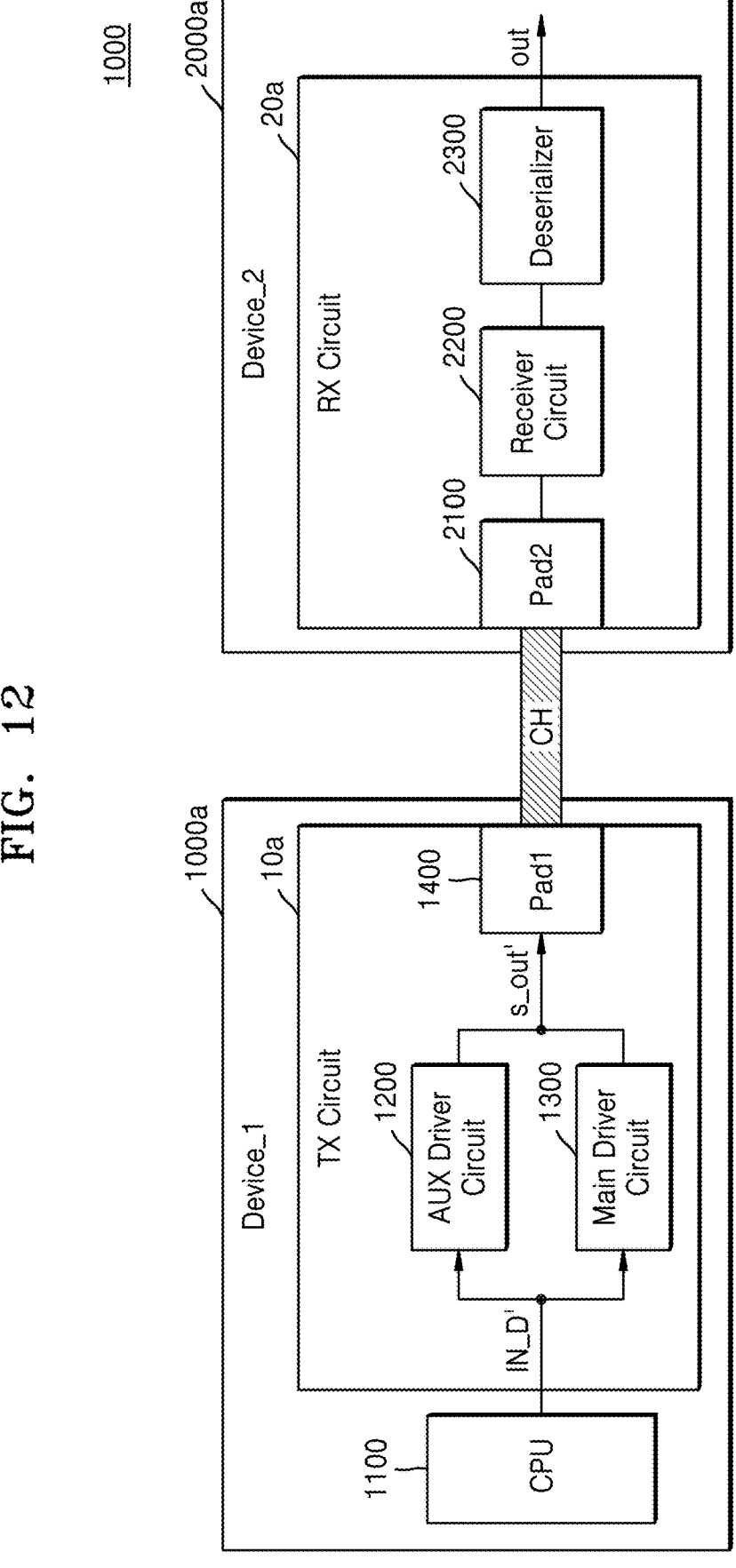
FIG. 12 is a block diagram showing a system according to an embodiment.

FIG. 12 is a block diagram showing a system according to an embodiment.

The system 1000 is an electronic system, may be mounted on a laptop computer, a smart phone, a tablet personal computer (PC), a personal digital assistant (PDA), an enterprise digital assistant (EDA), a digital camera, a portable multimedia player (PMP), a portable navigation device (PND), a handheld game console, a mobile internet device (MID), a multimedia device, a wearable computer, an Internet of Things (IoT) device, an Internet of Everything (IoE) device, an e-book device, a drone, an advanced drivers assistance system (ADAS), and an augmented reality (AR) device, etc., and may also be mounted on an electronic device that performs high-speed communication.

Referring to FIG. 12, the system 1000 may include a first device 1000a, a second device 2000a, and a channel CH. The first device 1000a may include a CPU 1100 and a data transmission circuit 10a. The CPU 1100 may also be referred to as an IP block that performs a particular function, and, for example, may refer to a functional block such as a graphics processing unit (GPU), a neural network processor (NPU), a communication processor (CP), each core of a multi-core processor, a power management unit (PMU), a clock management unit (CMU), a system BUS, a memory, a universal serial bus (USB), a peripheral component interconnect (PCI), a digital signal processor (DSP), a wired interface, a wireless interface, a controller, embedded software, a codec, a video module (e.g., a camera interface, a Joint Photographic Experts Group (JPEG) processor, a mixer, etc.), a three-dimensional graphics core, an audio system, a memory device, a memory chip, etc. The second device 2000a may include a data reception circuit 20a. The data transmission circuit 10a may include an auxiliary driver circuit 1200, a main driver circuit 1300, and an output pad

1400, and the data reception circuit 20a may include an input pad 2100, a receiver circuit 2200, and a deserializer 2300.

The data transmission circuit 10a may receive an input data signal IN_D' that the first device 1000a wants to transmit to the second device 2000a from the CPU 1100. The auxiliary driver circuit 1200 and the main driver circuit 1300 of the data transmission circuit 10a may each receive and drive the input data signal IN_D'. According to some embodiments, the auxiliary driver circuit 1200 may be configured to operate only in a section where a transition occurs by identifying the transition state of the input data signal IN_D'. In addition, the auxiliary driver circuit 1200 may control the time in which drivers of the auxiliary driver circuit 1200 are driven by delaying and controlling a signal indicating a transition state.

The auxiliary driver circuit 1200 and the main driver circuit 1300 may be connected to the output pad 1400, and the output of the auxiliary driver circuit 1200 and the output of the main driver circuit 1300 may be combined with each other and transmitted to the channel CH through the output pad 1400 as a first output signal s_out'. The data reception circuit 20a may receive the first output signal s_out' through the input pad 2100, and the first output signal s_out' may be transmitted to the receiver circuit 2200. The receiver circuit 2200 may transmit a signal received through the input pad 2100 to the deserializer 2300. The deserializer 2300 may parallelize serialized data and transmit parallelized data to the second device 2000a as a second output signal out.

While the inventive concept has been particularly shown and described with reference to embodiments thereof, it will be understood that various changes in form and detail may be made thereto without departing from the spirit and scope of the inventive concept as set forth in the following claims.

What is claimed is:

1. A data transmission circuit comprising:
an encoder configured to receive an input data signal and output a transition signal that indicates a transition state of the input data signal;
a first serializer that receives the transition signal;
an auxiliary driver configured to receive an output of the first serializer and drive an output node;
a second serializer that receives the input data signal; and
a main driver configured to receive an output of the second serializer and drive the output node.

2. The data transmission circuit of claim 1, wherein the transition signal comprises a rising signal that indicates a rising edge of the output of the first serializer, and the encoder is further configured to generate the rising signal by comparing adjacent bits of the input data signal.

3. The data transmission circuit of claim 1, wherein the transition signal comprises a falling signal that indicates a falling edge of the output of the first serializer, and the encoder is further configured to generate the falling signal by comparing adjacent bits of the input data signal.

4. The data transmission circuit of claim 1, wherein the encoder comprises a flip-flop configured to receive and delay a least significant bit (LSB) of the input data signal, and the encoder is further configured to compare the delayed LSB of the input data signal with a most significant bit (MSB) of a subsequent input data signal.

5. The data transmission circuit of claim 1, wherein the auxiliary driver is further configured to maintain a high impedance state when there is no transition of the input data signal.

6. The data transmission circuit of claim 1, wherein the first serializer comprises:
a first multiplexer configured to receive the transition signal and multiplex the transition signal into an internal signal; and
a second multiplexer configured to receive the internal signal and multiplex the internal signal into a serial signal.

7. The data transmission circuit of claim 6, wherein the second multiplexer comprises a delay circuit configured to delay a clock signal for multiplexing the internal signal.

8. The data transmission circuit of claim 7, wherein the delay circuit is further configured to control a driving time of the auxiliary driver by adjusting a delay time of the clock signal.

9. The data transmission circuit of claim 8, wherein the delay circuit is further configured to control the driving time of the auxiliary driver to be shorter than one unit interval (UI).

10. The data transmission circuit of claim 1, wherein the auxiliary driver comprises:
a first pre-driver configured to receive the output of the first serializer and output a first pull-up signal and a first pull-down signal; and
a first output driver configured to output a first output signal in response to the first pull-up signal and the first pull-down signal, and
the main driver comprises:
a second pre-driver configured to receive the output of the second serializer and output a second pull-up signal and a second pull-down signal; and
a second output driver configured to output a second output signal in response to the second pull-up signal and the second pull-down signal.

11. The data transmission circuit of claim 10, further comprising a calibration circuit configured to output a first driving control signal for controlling a driving strength of the auxiliary driver and a second driving control signal for controlling driving strength of the main driver.

12. A data transmission method comprising:
encoding an input data signal into a transition signal that indicates a transition state of the input data signal;
generating a first serial signal by serializing the transition signal;
driving an output node based on the first serial signal;
generating a second serial signal by serializing the input data signal; and
driving the output node based on the second serial signal,
wherein the transition signal comprises a rising signal that indicates a rising edge of the first serial signal and a falling signal that indicates a falling edge of the first serial signal.

13. The data transmission method of claim 12, wherein the encoding comprises comparing a first bit of the input data signal with a bit adjacent to the first bit.

14. The data transmission method of claim 12, wherein the generating of the first serial signal comprises:
generating an internal signal by multiplexing the rising signal and the falling signal; and
delaying a clock signal for multiplexing the internal signal, and the delaying of the clock signal comprises controlling a driving time of an auxiliary driver based on the first serial signal by adjusting a delay time of the clock signal.

15. The data transmission method of claim 12, wherein the driving of the output node based on the first serial signal comprises maintaining a high impedance state when there is no transition of the input data signal.

16. A system comprising a first device and a second device configured to communicate with the first device, wherein the first device comprises a data transmission circuit,
the data transmission circuit comprises:
an encoder configured to receive an input data signal and output a transition signal that indicates a transition state of the input data signal;
a first serializer that receives the transition signal;
an auxiliary driver that receives an output of the first serializer and is connected to an output node;
a second serializer that receives the input data signal; and
a main driver that receives an output of the second serializer and is connected to the output node, and
the second device comprises a data reception circuit configured to receive an output of the first device through the output node.

17. The system of claim 16, wherein the transition signal comprises a rising signal that indicates a rising edge of the output of the first serializer, and
the encoder comprises:
an XOR gate configured to receive a first bit of the input data signal and a second bit adjacent to the first bit; and
an AND gate configured to receive an output of the XOR gate and the second bit to output the rising signal.

18. The system of claim 16, wherein the transition signal comprises a falling signal that indicates a falling edge of the output of the first serializer, and
the encoder comprises:
an XOR gate configured to receive a first bit of the input data signal and a second bit adjacent to the first bit;
an inverter configured to receive the second bit; and
an AND gate configured to receive an output of the XOR gate and an output of the inverter to output the falling signal.

19. The system of claim 16, wherein the first serializer comprises:
a first multiplexer configured to receive the transition signal and multiplex the transition signal into an internal signal; and
a second multiplexer configured to receive the internal signal and multiplex the internal signal into a serial signal, and
the second multiplexer comprises at least one transistor configured to delay a clock signal for multiplexing the internal signal.

20. The system of claim 16, wherein the auxiliary driver comprises:
a first pre-driver configured to receive the output of the first serializer and output a first pull-up signal and a first pull-down signal;
a first pull-up transistor configured to be driven based on the first pull-up signal; and
a second pull-down transistor configured to be driven based on the first pull-down signal, and
the main driver comprises:
a second pre-driver configured to receive the output of the second serializer and output a second pull-up signal and a second pull-down signal;

a second pull-up transistor configured to be driven based on the second pull-up signal; and a second pull-down transistor configured to be driven based on the second pull-down signal.

* * * * *